(12) United States Patent
Joye et al.

(10) Patent No.: US 8,700,921 B2
(45) Date of Patent: Apr. 15, 2014

(54) FAULT-RESISTANT EXPONENTIATION ALGORITHM

(75) Inventors: Marc Joye, Fougeres (FR); Mohamed Karroumi, Rennes (FR)

(73) Assignee: Thomson Licensing, Issy les Moulineaux (FR)

(*) Notice: Subject to any disclaimer, the term of this patent is extended or adjusted under 35 U.S.C. 154(b) by 33 days.

(21) Appl. No.: 13/487,457

(22) Filed: Jun. 4, 2012

(65) Prior Publication Data
US 2012/0321075 A1 Dec. 20, 2012

(30) Foreign Application Priority Data

Jun. 17, 2011 (EP) .................................. 11305755
Oct. 25, 2011 (EP) .................................. 11186533

(51) Int. Cl.
*H04L 9/28* (2006.01)
*H04K 1/00* (2006.01)

(52) U.S. Cl.
USPC .............................. 713/193; 380/28; 708/490

(58) Field of Classification Search
None
See application file for complete search history.

(56) References Cited

U.S. PATENT DOCUMENTS

| | | | |
|---|---|---|---|
| 6,182,216 B1* | 1/2001 | Luyster | 713/168 |
| 6,199,162 B1* | 3/2001 | Luyster | 713/168 |
| 6,578,150 B2* | 6/2003 | Luyster | 380/37 |
| 6,751,319 B2* | 6/2004 | Luyster | 380/37 |
| 7,742,595 B2* | 6/2010 | Joye et al. | 380/28 |
| 7,787,620 B2* | 8/2010 | Kocher et al. | 380/29 |
| 8,139,763 B2* | 3/2012 | Boscher et al. | 380/28 |
| 8,386,800 B2* | 2/2013 | Kocher et al. | 713/189 |
| 8,457,303 B2* | 6/2013 | Joye | 380/1 |
| 2006/0029224 A1* | 2/2006 | Baek et al. | 380/30 |

(Continued)

FOREIGN PATENT DOCUMENTS

| | | |
|---|---|---|
| WO | 98/52319 | 11/1998 |
| WO | WO2006103341 | 10/2006 |

OTHER PUBLICATIONS

Joye et al., "Memory-Efficient Fault Countermeasures", CARDIS 2011, LNCS, vol. 7079, Sep. 14, 2011, pp. 84-101.

(Continued)

*Primary Examiner* — Christopher Revak
(74) *Attorney, Agent, or Firm* — Robert D. Shedd; Patricia A. Verlangieri

(57) ABSTRACT

A method for performing a m-ary right-to-left exponentiation using a base x, a secret exponent d and a modulus N, wherein m is a power of 2. A device having a processor and m+1 registers $R[0]-R[m]$ in at least one memory: initializes register $R[0]$ to h for a chosen value h, wherein the order of the value h is a divisor of $m*(m-1)/2$, register $R[m]$ to $x^{(m-1)}$ and the registers other than $R[0]$ and $R[m]$ to the value h; updates register $R[r]$ to $R[r]$ times x, wherein r is the remainder of a division of d by $(m-1)$ mod N; obtains a working exponent q that is the quotient of the division of d by $(m-1)$; performs l iterations, starting at $i=0$, of: setting $R[q_i]$ to $R[q_i]$ times $R[m]$ and raising $R[m]$ to the power of m, where l is the length of q in base m and $q_i$ is the i-th digit of the representation of q in base m and $q_{i-1}$ is non-zero; verifies the correctness of the result by checking that $R[m]$ equals the product of registers $R[0]-R[m-1]$ to the power of $m-1$; and outputs the product of $R[j]^j$, where $1 \le j \le m-1$, only if the correctness is successfully verified.

3 Claims, 1 Drawing Sheet

(56) References Cited

U.S. PATENT DOCUMENTS

2006/0282491 A1* 12/2006 Joye .............................. 708/492
2009/0067617 A1* 3/2009 Trichina et al. ................. 380/28
2011/0216900 A1* 9/2011 Yoon et al. ...................... 380/28
2012/0221618 A1* 8/2012 Feix et al. ...................... 708/524
2013/0173928 A1* 7/2013 Kocher et al. ................. 713/189

OTHER PUBLICATIONS

Baek, "Regular 2 w-ary right-to-left Exponentiation Algorithm with Very Efficient DPA and FA Countermeasures", International Journal of Information Security, vol. 9, No. 5, Sep. 24, 2010, pp. 363-370.

Joye et al., "Highly Regular m-Ary Powering Ladders", SAC 2009, LNCS, vol. 5867, Aug. 13, 2009, pp. 350-363.

European Search Report dated Dec. 15, 2011.

Kocher et al. "Differential Power Analysis", Cryptography Research Inc. Advances in Cryptology-CRYPT0'99, vol. 1666 of Lecture Notes in Computer Science, pp. 388-397. Springer-Verlag, year 1999.

Clavier et al. "Universal Exponentation Algorithm—A First Step Towards Provable SPA-resistance", Cryptographic hardware and Embedded Systems, vol. 2162 of Lecture Notes in Computer Science, pp. 300-308, Springer-Verlag, year 2001.

Yao, "On Evaluation of Powers", Siam J. Comput, vol. 5, No. 1, Mar. 1976.

Boscher et al., "CRT RSA Algorithm Protected Against Fault Attacks", Information Security Theory and Practices, vol. 4462 of Lecture Notes in Computer Science, pp. 229-243, Springer-Verlag, year 2007.

\* cited by examiner

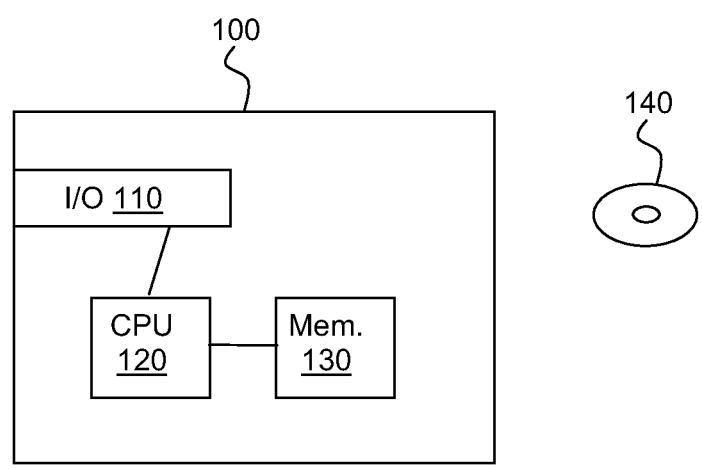

FAULT-RESISTANT EXPONENTIATION ALGORITHM

This application claims the benefit, under 35 U.S.C. §119 of EP Patent Application 11305755.8, filed 17 Jun. 2011 and EP Patent Application 11186533.3, filed 25 Oct. 2011.

TECHNICAL FIELD

The present invention relates generally to cryptography, and in particular to an exponentiation algorithm resistant against side channel attacks.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is well known in the field of cryptography that implementations of exponentiation algorithms need to be resistant against side channel attacks. It has for example been shown that RSA private keys can be retrieved by observing the power consumption of the microprocessor that executes the algorithm—see P. Kocher, J. Jaffe, and B. Jun. "Differential Power Analysis". In M. J. Wiener, editor, Advances in Cryptology CRYPTO '99, volume 1666 of *Lecture Notes in Computer Science*, pages 388-397, Springer-Verlag, 1999.

These so-called Simple Power Attacks (SPA) target basic exponentiation algorithm based on the square and multiply technique. A first countermeasure was to make sure that a squaring operation is always followed by a multiplication, no matter the value of the bit of the exponent. In this case, the multiplication is sometimes a fake multiplication. This is known as the square and multiply always algorithm—see C. Clavier and M. Joye. "Universal Exponentiation Algorithm". In Ç. K. Koç, D. Naccache, and C. Paar, editors, *Cryptographic Hardware and Embedded Systems—CHES 2001*, volume 2162 of *Lecture Notes in Computer Science*, pages 300-308. An exemplary right-to-left algorithm is given by:

```
Input: x, d = (d_{l-1}, ..., d_0)_2
Output: y = x^d
R[0] ← 1; R[1] ← 1, R[2] ← x,
for i=0 to l-1
    if d_i=0 then
        R[0] ← R[0] * R[2]; (fake multiplication)
        R[2] ← R[2]^2;
    if d_i=1 then
        R[1] ← R[1] * R[2];
        R[2] ← R[2]^2;
end
return R[1]
```

It will be appreciated that the 'mod N' have been left out for reasons of clarity; this is the case throughout the description.

Another threat against cryptographic algorithms based on exponentiation are Fault Attacks (FA) that introduce random errors during execution of the algorithm in the hope of gleaning useful information from the result.

Several techniques have been proposed to mitigate this attack. A first solution is to perform the exponentiation twice and compare the results. A second solution, described in WO 98/52319, is to use the public exponent e associated to d to check that the result is correct before it is output.

These solutions are however costly and more efficient techniques have been proposed. In particular, Boscher, Naciri and Prouff provide a more efficient method that provides an implementation resistant against both SPA and FA—see Arnaud Boscher, Robert Naciri, and Emmanuel Prouff. CRT RSA Algorithm Protected against Fault Attacks. In D. Sauveron et al., editors, *Information Security Theory and Practices (WISTP 2007)*, volume 4462 of *Lecture Notes in Computer Science*, pages 229-243, Springer-Verlag, 2007.

```
Input: x, d = (d_{l-1}, ..., d_0)_2
Output: y = x^d
R[0] ← 1; R[1] ← 1, R[2] ← x,
for i=0 to l-1
    if d_i=0 then
        R[0] ← R[0] * R[2]; (SPA protection)
        R[2] ← R[2]^2;
    if d_i=1 then
        R[1] ← R[1] * R[2];
        R[2] ← R[2]^2;
end
if R[2] ≠ R[0] * R[1] * x then return 'error' (FA protection)
return R[1]
```

The algorithm relies on the observation that the ratio between R[2] and R[0] times R[1] is always equal to the base input x at each iteration of the algorithm. Thus, verifying before the output that R[2]=R[0]*R[1]*x is sufficient to counter fault attacks.

A generalised version, right-to-left m-ary exponentiation has been proposed by Andrew Chi-Chih Yao in "On the Evaluation of Powers". *SIAM J. Comput.*, 5(1):100-103, 1976. The algorithm is vulnerable to SPA as an attacker is able to detect when a zero bit in the exponent is treated. To counter this, a fake multiplication is generally added when the bit exponent is zero. Such an algorithm is said SPA-resistant and is illustrated below. This algorithm requires m+1 registers in memory to compute $x^d$.

```
Input: x, d = (d_{l-1}, ..., d_0)_m
Output: y = x^d
for i=0 to m-1
    R[i] ← 1
end
R[m] ← x
for i=0 to l-2
    if d_i=0 then
        R[0] ← R[0] * R[m]; (SPA protection)
        R[m] ← R[m]^m;
    if d_i=1 then
        R[1] ← R[1] * R[m];
        R[m] ← R[m]^m;
    ...
    if d_i=m-1 then
        R[m-1] ← R[m-1] * R[m];
        R[m] ← R[m]^m;
end
R[d_{l-1}] ← R[d_{l-1}] * R[m];
R[m-1] ← R[1] * R[2]^2 * R[3]^3 * ... * R[m-1]^{m-1}
return R[m-1]
```

Yoo-Jin Baek has generalized the method from to Boscher, Naciri and Prouff, in a recent paper "Regular $2^w$-ary right-to-left exponentiation algorithm with very efficient DPA and FA countermeasures." *International Journal of Information Security*, 9(5):363-370, 2010, where he shows how Yao's algorithm can be adapted to resist against fault attacks. The coherence check between the different values involved in the computation is based on the following relation:

if $R[m]*x \neq (R[0]*R[1]*R[2]* \ldots *R[m-1])^{m-1}$ then return 'error'

Although the previous techniques are efficient in term of computation, they are not well suited for memory-constrained environments. It can therefore be appreciated that there is a need for a solution that provides an attack-resistant exponentiation algorithm suitable for memory-constrained devices. This invention provides such a solution.

SUMMARY OF INVENTION

In a first aspect, the invention is directed to a method for performing a m-ary right-to-left exponentiation using a base x, a secret exponent d and a modulus N, wherein m is a power of 2, the method comprising the steps, in a device having a processor and m+1 registers R[0]-R[m] in at least one memory), of:

initializing register R[0] to h for a chosen value h, wherein the order of the value h is a divisor of $m*(m-1)/2$;
initializing register R[m] to $x^{(m-1)}$;
initializing the registers other than R[0] and R[m] to the value h;
updating register R[r] to R[r] times x, wherein r is the remainder of a division of d by (m−1) mod N;
obtaining a working exponent q that is the quotient of the division of d by (m−1);
performing l iterations, starting at i=0, of:
    setting $R[q_i]$ to $R[q_i]$ times R[m]; and
    raising R[m] to the power of m;
where l is the length of q in base m and $q_i$ is the i-th digit of the representation of q in base m and $q_{l-1}$ is non-zero;
verifying the correctness of the result by checking that R[m] equals the product of registers R[0]-R[m−1] to the power of m−1; and
outputting the product of $R[j]^j$, where $1 \leq j \leq m-1$, only if the correctness is successfully verified.

In a first aspect, the invention is directed to an apparatus for performing a m-ary right-to-left exponentiation using a base x and an exponent d, the apparatus comprising m+1 registers R[0]-R[m] in at least one memory and a processor configured to:

initialize register R[0] to h for a chosen value h, wherein the order of the value h is a divisor of $m*(m-1)/2$;
initialize register R[m] to $x^{(m-1)}$;
initialize the registers other than R[0] and R[m] to the value h;
update register R[r] to R[r] times x, wherein r is the remainder of a division of d by (m−1) mod N;
obtain a working exponent q that is the quotient of the division of d by (m−1);
perform l iterations, starting at i=0, of:
    setting $R[q_i]$ to $R[q_i]$ times R[m]; and
    raising R[m] to the power of m;
where l is the length of q in base m and $q_i$ is the i-th digit of the representation of q in base m and $q_{l-1}$ is non-zero;
verify the correctness of the result by checking that R[m] equals the product of registers R[0]-R[m−1] to the power of m−1; and
output the product of $R[j]^j$, where $1 \leq j \leq m-1$, only if the correctness is successfully verified.

In a third aspect, the invention is directed to a computer program product having stored thereon instructions that, when executed by a processor, performs the method of the first aspect.

BRIEF DESCRIPTION OF DRAWINGS

Preferred features of the present invention will now be described, by way of non-limiting example, with reference to the accompanying drawings, in which FIG. 1 illustrates an apparatus for executing fault-resistant elliptic curve cryptography calculations according to a preferred embodiment of the invention.

DESCRIPTION OF EMBODIMENTS

It will be appreciated that the algorithm proposed by Boscher et al. requires at least three accumulators R[0], R[1] and R[2] and additional temporary buffer to store the value of the base input x. Given that one accumulator R[0] is only used for the fake multiplication, a main inventive idea of the present invention is to store the value of x inside R[0] at the start of the algorithm (i.e. before the for-loop).

Remarkably, it has been found that the ratio between R[2] and R[0] times R[1] can be a constant value that is far smaller than the base input x and that is completely independent from x. For example, in the right-to-left binary method, the ratio is equal to one at each iteration. This means that the additional temporary buffer containing the value of x is not needed. In other words, the classical fake multiplication is used not only to counter SPA but also for FA protection by saving memory and reducing the computation overhead of the FA protection.

Given that R[0] and R[2] are initialized to x, checking the correctness of modular exponentiation is very fast by verifying whether $R[2] = R[0]*R[1]$ mod N.

---

Input: $x, d = (d_{l-1}, \ldots, d_0)_2$
Output: $y = x^d$
$R[0] \leftarrow x; R[1] \leftarrow 1; R[2] \leftarrow x;$
for i=0 to l−1
    if $d_i$=0 then
        $R[0] \leftarrow R[0] * R[2]$; (SPA protection + useful to FA protection)
        $R[2] \leftarrow R[2]^2$;
    if $d_i$= 1 then
        $R[1] \leftarrow R[1] * R[2]$;
        $R[2] \leftarrow R[2]^2$;
end
if $R[2] \neq R[0] * R[1]$ then return 'error' (FA protection )
return R[1]

---

The equality—$R[2] \equiv R[0]*R[1]$ mod N—holds before the for-loop (R[1]=1) and also at each iteration of the for-loop provided that no fault has been introduced. Indeed, within the for-loop R[2] is always squared while R[0] is set to R[0]*R[2] when the bit value of the exponent is zero, and R[1] is set to R[1]*R[2] otherwise.

Suppose that the equality holds at step i, i.e. $R[2]^i \equiv R[0]^i * R[1]^i$ mod N. Suppose further that at step i+1 the bit value of the exponent is zero, i.e. $d_i$=0. Then $R[2]^{i+1} \equiv R[2]^i * R[2]^i$ mod N, $R[0]^{i+1} \equiv R[0]^i * R[2]^i$ mod N and $R[1]^{i+1} = R[1]^i$ (as the exponent bit is zero). Thus $R[2]^{i+1} \equiv R[0]^i * R[1]^i * R[2]^i \equiv R[1]^{i+1} * R[0]^i * R[2]^i \equiv R[1]^{i+1} * R[0]^{i+1}$ mod N.

This relation can also be obtained when $d_i$=1.

It will thus be appreciated that the equality holds at step i+1. By induction, it has then been shown that the relation is true whatever the value of i and $d_i$. This is then also true at the end of the for-loop, which means that it therefore is sufficient to check the correctness at the end of the for-loop to detect all errors.

It should be noted that the technique only needs three accumulators R[0], R[1] and R[2]. In addition, the technique is more efficient than the method provided by Boscher et al. as it at the end only requires one multiplication for the FA protection.

The general idea may also be generalised to the m-ary case.

Consider the right-to-left m-ary exponentiation algorithm to compute $y=x^d$. If $m \geq 2$ and $d>0$, then there exist unique integers q and r such that $d=(m-1)\cdot q+r$ and $0 \leq r < m-1$. We can write the radix-m expansion of q as $$\sum_{i=0}^{l-1} q_i m^i.$$

Then, it is possible to write $$x^d = x^r \cdot \prod_{j=1}^{m-1} (R[j])^j$$

with $$R[j] = \prod_{\substack{0 \leq i \leq l-1 \\ q_i'' = j}} x^{(m-1)\cdot m^i}.$$

Since $0 \leq r \leq m-2$, and j spans the range from 1 to m−1, then $$x^d = \begin{cases} \prod_{j=1}^{m-1} (R[j])^j, & \text{if } r = 0, \\ (x \cdot R[r])^r \cdot \prod_{\substack{j=1 \\ j \neq r}}^{m-1} (R[j])^j, & \text{otherwise} \end{cases}$$

This means, that if Yao's Algorithm is initialized with R[m] to $x^{m-1}$ and R[r] to x for some $r \in (1, \ldots, m-2)$ and then, after the main loop, each R[j] is raised to the power $j \in (1, \ldots, m-1)$ and then the product of the results is computed, i.e. $\Pi_j(R[j])^j$, the same result is obtained as when R[j] are all set to one and the accumulator R[m] to x.

When d is a multiple of m−1, R[0] is initialized to x and since R[0] is only used for the fake multiplication, this has no effect on the exponentiation result.

---

```
Input: x, d
Output: y = x^d
              Initialization
for i=0 to m−1
  R[i] ← 1
end
R[d % m−1] ← x
d ← d/ (m−1) = (d_{l−1}, ..., d_0)_m
R[m] ← x^(m−1)
              Main loop
for i=0 to l−1
  if d_i=0 then
     R[0] ← R[0] * R[m]; (SPA protection)
     R[m] ← R[m]^m ;
  if d_i=1 then
     R[1] ← R[1] * R[m];
     R[m] ← R[m]^m ;
  ...
  if d_i=m−1 then
     R[m−1] ← R[m−1] * R[m];
     R[m] ← R[m]^m ;
end
              Check fault
if R[m] ≠ (R[0] * R[1]* R[2] * ... * R[m−1])^{m−1} then return 'error'
              Aggregation
R[m−1] ← R[1] * R[2]^2* R[3]^3 * ... * R[m−1]^{m−1}
return R[m−1]
```

---

The resistance of this algorithm against fault attacks is based on the relation $$\prod_{j=0}^{m-1} (R[j])^{m-1} = R[m].$$

The accumulator R[m] is raised to the power of m at each iteration. To avoid confusion, $R[m]^{(i)}$ denotes the content of the temporary variable R[m] before entering step i, i.e. $R[m]^{(i)} = x^{(m-1)m^i}$. The variables R[j] are all initialized to 1 except when j=r for some $r \leq m-2$, i.e. R[r]←x. Before the main loop, the product $$\prod_{j=0}^{m-1} R[j]$$

is equal to x and at each iteration only one variable R[j] is updated depending on the digit value of the exponent q. That is $R[d'_i] \leftarrow R[d'_i] \cdot R[m]^{(i-1)}$ where $1 \leq i \leq l-2$ and $R[m]^{(0)} = x^{m-1}$.

Hence, at iteration $i \geq 0$, $$B := \prod_{j=0}^{m-1} R[j]$$
$$= x \cdot R[m]^{(0)} \cdot \ldots \cdot R[m]^{(i-1)}$$
$$= x^{1+m-1(1+m+m^2+\ldots+m^{i-1})}$$
$$= x^{1+m^i-1}$$
$$= x^{m^i},$$
$$\Rightarrow B^{m-1} = x^{(m-1)\cdot m^i} = R[m]^{(i)}.$$

Finally, at the end of the computation $$B := \prod_{i=0}^{m-1} R[i] = x^{m^l} \text{ and thus } B^{m-1} = R[m].$$

If an error occurs at any time during the computation, the coherence between $\Pi_j R[j]$ and R[m] is lost. This provides resistance against fault attacks.

Regarding efficiency, the present algorithm requires the computation of a quotient and a remainder of the exponent d by m−1. These operations are at cost and can be both relatively slow when the exponent is large (i.e. 1024 bits). In general, bases which are not powers of 2 are less memory-efficient to use as they require an additional register for raising R[m] to the power m. Also, the increase in speed is not significant as m grows and is of less interest in the context of memory-constrained devices. Consequently, it is advantageous to use a base that is a power of 2; with a small 2-power value m the division operation of d by m−1 is faster. The following table shows the efficiency measured in terms of multiplication counts algorithm for small values of m, with m=2, 4, 8, 16, 32, 64, and compares this with prior art implementations:

|  |  | Nb of registers | 1024 bits | |
|---|---|---|---|---|
|  |  |  | Square/Mult = 1 | SquareMul = .8 |
| Boscher et al. | m = 2 | 4 | 2050 | 1845 |
| Baek | m = 4 | 8 | 1546 | 1341 |
|  | m = 8 | 12 | 1391 | 1187 |
|  | m = 16 | 20 | 1338 | 1133 |
|  | m = 32 | 36 | 1351 | 1146 |
|  | m = 64 | 68 | 1445 | 1230 |
| Present algorithm | m = 2 | 3 | 2049 | 1845 |
|  | m = 4 | 5 | 1544 | 1339 |
|  | m = 8 | 9 | 1385 | 1180 |
|  | m = 16 | 17 | 1318 | 1113 |
|  | m = 32 | 33 | 1302 | 1096 |
|  | m = 64 | 65 | 1335 | 1129 |

In term of memory space, the algorithm needs only m+1 registers. Prior art right-to-left exponentiation algorithms require at least an additional temporary buffer for the base input x. The algorithm thus requires one register memory less regardless of the m-radix value. The gain is most significant in the binary case as it represents a 25% memory space saving.

In certain cases, multiplication by neutral element $1_G$ may be distinguished, which is turn, may leak information on secret exponent d. For a modular exponentiation (i.e. all operations are done modulo a fixed number N), there exists a technique to avoid this: the temporary variables R[j] can be multiplied by an element of small order in G (card(G)=N) at the initialization step. As an illustration, suppose that they are all multiplied by some element h of order 2. More specifically, the initialization becomes

```
Initialization
for i=0 to m−1
    R[i] ← h
end
R[d % m−1] ← h·x
d ← d/ (m−1) = (d_{l−1}, ..., d_0)_m
R[m] ← x^(m−1)
``` for some h∈G such that $h^2=1_G$. Then at each iteration, it is easily seen that the product of R[0]*R[1]*R[2]* ... * R[m−1] contains a surplus factor $h^m$, when m is even (which is always the case for m=$2^w$) then $h^m=1$ and so the coherence check is unchanged. Furthermore, the computation of R[m−1] in the aggregation step is also unchanged when m=$2^w$ and w>1. Indeed, the surplus factor for R[1]*R[2]²*R[3]³* ... *R[m−1]$^{m-1}$ is $$h^{\frac{m(m-1)}{2}}$$

since m(m−1)/2 is even when m=$2^w$ and w>1.

In the binary case (i.e., when w=1), m(m−1)/2=1 and consequently the product R[1]*R[2]²*R[3]³* ... * R[m−1]$^{m-1}$ needs to be multiplied by h to get the correct output. Note that for the RSA cryptosystem with a modulus N, it is possible to take h=N−1 which is of order 2 since $(N-1)^2=1 \pmod N$.

```
Input: x, d = (d_{l-1}, ..., d_0)_2
Output: y = x^d
R[0] ← h * x; R[1] ← h; R[2] ← h * x;
for i=0 to l−1
```

```
    if d_i=0 then
        R[0] ← R[0] * R[2]; (SPA protection + useful to FA protection)
        R[2] ← R[2]² ;
    if d_i=1 then
        R[1] ← R[1] * R[2];
        R[2] ← R[2]² ;
end
if R[2] ≠ R[0] * R[1] then return 'error' (FA protection )
return h*R[1]
```

Note that for RSA all the computation are done modulo N, an additional register R[3] is then used for storing the value of N. Therefore, taking h=N−1 avoids resorting to an additional register for computing h*R[1] at the end (i.e. h*R[1] is computed as R[2]←R[3]−1 and R[1]←R[1]*R[2] modulo R[3]).

The technique can also be adapted to other elements of small order. It would however require an additional register for computing the correct output h*R[1] at the end. A more efficient method exists when d is odd (as it is the case for RSA), which consists to initialize R[0] to x^2, R[1] to x, and the for-loop index at i=1. On the top of avoiding multiplication by h (and thus saving potentially one memory register), this allows to save one more multiplication (i.e. multiplication of iteration i=0).

```
Input: x, d = (d_{l-1}, ..., d_0)_2
Output: y = x^d
R[0] ← x²; R[1] ← x ; R[2] ← x ;
for i=1 to l−1
    if d_i=0 then
        R[0] ← R[0] * R[2]; (SPA protection + useful to FA protection)
        R[2] ← R[2]² ;
    if d_i= 1 then
        R[1] ← R[1] * R[2];
        R[2] ← R[2]² ;
end
if R[2] ≠ R[0] * R[1] then return 'error' (FA protection )
return R[1]
```

The key idea that allows to save one memory register (of size a group element) over previous implementations is provided by the division operation in the initialization step. That is the division of d by m−1 such that d=(m−1)·q+r. The solution works also if the divisor is a multiple of m−1. Let d=a·(m−1)·q+r=β·q+r whith a an integer greater than one. If R[0], R[1], ..., R[m−1] are initialized such that their product is $x^a$ then at the end of the computation we have $$B := \prod_{j=0}^{m-1} R[j]$$
$$= x \cdot R[m]^{(0)} \cdot \ldots \cdot R[m]^{(l-1)}$$
$$= x^{a+\beta(1+m+m^2+\ldots+m^{l-1})}$$
$$= x^{a+a \cdot m^l - a}$$
$$= x^{a \cdot m^l},$$

$$\Rightarrow B^{m-1} = x^{a \cdot (m-1) \cdot m^l} = R[m]^{(l)}.$$

Thus, the coherence check still holds.
Example in Base 4
In this ternary example, d is set to 13883 (decimal notation) and m=4. d=(m−1)·q+r=3·4627+2, where q is represented as $(1,0,2,0,1,0,3)_4$. Therefore, the accumulator A is initialized to $x^3$ (as (m−1)=3) and the variable R[2] (as r=2) to x. The remaining variables R[0], R[1] and R[3] are all set to 1. The powers of x computed in the main loop (through the accumulator R[4]) are the following:

$$A = \{x^3, R[4]^{(0)}, \ldots, R[4]^{(5)}\} = \{x^3, x^{12}, x^{48}, x^{192}, x^{768}, x^{3072}, x^{12288}\}.$$

Now, for i∈0, . . . , 5, $R[q_i] = R[q_i] \cdot A[i]$ are computed (A is scanned from left to right and q from right to left). Then:

$R[0] = x^{12} \cdot x^{192} \cdot x^{3072} = x^{3276}$
$R[1] = x^{48}$
$R[2] = x \cdot x^{768} = x^{769}$
$R[3] = x^3$ The relation $(R[0] \cdot R[1] \cdot R[2] \cdot R[3])^3 = (x^{3276} \cdot x^{48} \cdot x^{769} \cdot x^3)^3 = x^{12288} = R[4]$ is verified.

After the main loop, R[1] is updated, i.e. $R[1] = x^{48} \cdot x^{12288} = x^{12336}$ and $y = R[1] \cdot R[2]^2 \cdot R[3]^3 = x^{12336} \cdot x^{2 \cdot 769} \cdot x^{3 \cdot 3} = x^{13883}$, which can be computed as proposed in the final step of Yao's Algorithm.

FIG. 1 illustrates a device according to a preferred embodiment of the present invention. The device 100 comprises at least one interface unit 110 adapted for communication with other devices (not shown), at least one processor 120 and at least one memory 130 adapted for storing data, such as accumulators and intermediary calculation results. The processor 120 is adapted to perform an exponentiation according to any of the embodiments of the inventive methods, as previously described herein. A computer program product 140 such as a CD-ROM or a DVD comprises stored instructions that, when executed by the processor 120, performs the method according to any of the embodiments of the invention.

The proposed technique is optimal in the sense that it adds FA-resistance to an underlying SPA-resistant exponentiation algorithm while reducing memory space requirements and introducing a minimal computational overhead. Indeed, it permits to save one register memory in RAM which in practice, for example for RSA or DSA, is of 1024-bit or 2048-bit length. The amount of memory space saved is then significant, especially in the binary case where it represents ¼ of the memory space used by prior art algorithms. Further, the technique can be more computationally efficient than prior art techniques.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method for performing a m-ary right-to-left exponentiation using a base x, a secret exponent d and a modulus N, wherein m is a power of 2, the method comprising the steps, in a device having a processor and m+1 registers R[0]-R[m] in at least one memory, of:
   initializing register R[0] to h for a chosen value h, wherein the order of the value h is a divisor of m*(m−1)/2;
   initializing register R[m] to $x^{(m-1)}$;
   initializing the registers other than R[0] and R[m] to the value h;
   updating register R[r] to R[r] times x, wherein r is the remainder of a division of d by (m−1) mod N;
   obtaining a working exponent q that is the quotient of the division of d by (m−1);
   performing l iterations, starting at i=0, of:
      setting $R[q_i]$ to $R[q_i]$ times R[m]; and
      raising R[m] to the power of m;
   where l is the length of q in base m and $q_i$ is the i-th digit of the representation of q in base m and $q_{l-1}$ is non-zero;
   verifying the correctness of the result by checking that R[m] equals the product of registers R[0]-R[m−1] to the power of m−1; and
   outputting the product of $R[j]^j$, where 1≤j≤m−1, only if the correctness is successfully verified.

2. An apparatus for performing a m-ary right-to-left exponentiation using a base x and an exponent d, the apparatus comprising m+1 registers R[0]-R[m] in at least one memory and a processor (120) configured to:
   initialize register R[0] to h for a chosen value h, wherein the order of the value h is a divisor of m*(m−1)/2;
   initialize register R[m] to $x^{(m-1)}$;
   initialize the registers other than R[0] and R[m] to the value h;
   update register R[r] to R[r] times x, wherein r is the remainder of a division of d by (m−1) mod N;
   obtain a working exponent q that is the quotient of the division of d by (m−1);
   perform l iterations, starting at i=0, of:
      setting $R[q_i]$ to $R[q_i]$ times R[m]; and
      raising R[m] to the power of m;
   where l is the length of q in base m and $q_i$ is the i-th digit of the representation of q in base m and $q_{l-1}$ is non-zero;
   verify the correctness of the result by checking that R[m] equals the product of registers R[0]-R[m−1] to the power of m−1; and
   output the product of $R[j]^j$, where 1≤j≤m−1, only if the correctness is successfully verified.

3. A computer program product stored on a non-transitory computer readable storage medium embodying instructions that, when executed by a processor, performs the method of claim 1.

* * * * *